(12) United States Patent
Schlechter

(10) Patent No.: US 9,716,845 B2
(45) Date of Patent: Jul. 25, 2017

(54) DIGITAL CAMERA

(71) Applicant: SKIDATA AG, Groedig/Salzburg (AT)

(72) Inventor: Thomas Schlechter, Seekirchen am Wallersee (AT)

(73) Assignee: SKIDATA AG, Groedig/Salzburg (AT)

( * ) Notice: Subject to any disclaimer, the term of this patent is extended or adjusted under 35 U.S.C. 154(b) by 285 days.

(21) Appl. No.: 14/639,186

(22) Filed: Mar. 5, 2015

(65) Prior Publication Data

US 2015/0256767 A1    Sep. 10, 2015

(30) Foreign Application Priority Data

Mar. 6, 2014 (DE) .......................... 10 2014 103 010

(51) Int. Cl.
*H04N 7/18* (2006.01)
*H04N 5/33* (2006.01)
(Continued)

(52) U.S. Cl.
CPC ............. *H04N 5/33* (2013.01); *G01S 7/4816* (2013.01); *G01S 7/4865* (2013.01); *G01S 17/023* (2013.01); *G01S 17/08* (2013.01); *G01S 17/89* (2013.01); *G02B 5/281* (2013.01); *H04N 5/2254* (2013.01); *H04N 5/332* (2013.01); *H04N 13/0207* (2013.01); *H04N 13/0253* (2013.01);
(Continued)

(58) Field of Classification Search
CPC .... G01S 7/4816; G01S 7/4865; G01S 17/023; G01S 17/08; G01S 17/89; G02B 5/281; H04N 5/2254; H04N 5/332; H04N 13/0207; H04N 13/0253

USPC ................... 348/46, 135–137, 131–133, 148
See application file for complete search history.

(56) References Cited

U.S. PATENT DOCUMENTS 5,200,602 A * 4/1993 Ikebe ....................... G02B 7/28
                                                        250/201.6
6,252,659 B1   6/2001 Norita et al.
(Continued)

FOREIGN PATENT DOCUMENTS

DE           10018444 B4     1/2006
DE           60203689 T2     3/2006
(Continued)

*Primary Examiner* — Helen Shibru
(74) *Attorney, Agent, or Firm* — Karl F. Milde, Jr.; Eckert Seamans Cherin & Mellott, LLC

(57) ABSTRACT

A digital camera has a 2D image sensor designed as a CCD or CMOS sensor that can be used to measure distances based on a runtime measurement in synchronization with a pulsed infrared source. The measured distances are used to carry out a 3D reconstruction of a detected object. The digital camera does not have to have an infrared cut-off filter; however, it can have an infrared cut-off filter that can be dynamically activated in full or in part or deactivated in relation to pixels of the image sensor. In the latter event, individual areas of the image sensor, for which the infrared cut-off filter is deactivated, are used for the 3D reconstruction or for images in the infrared range. The remaining areas of the sensor are used for images of high color quality in the visible light spectrum. In the event that no infrared cut-off filter is present, individual areas of the image sensor are used for the 3D reconstruction or for images in the infrared range. The remaining areas of the sensor are used for images in the visible light spectrum.

16 Claims, 10 Drawing Sheets

(51) Int. Cl.
  *G01S 17/02*   (2006.01)
  *G01S 17/89*   (2006.01)
  *G01S 7/481*   (2006.01)
  *G02B 5/28*    (2006.01)
  *G01S 7/486*   (2006.01)
  *G01S 17/08*   (2006.01)
  *H04N 13/02*   (2006.01)
  *H04N 5/225*   (2006.01)
  *H04N 5/232*   (2006.01)
  *H04N 5/222*   (2006.01)
  *H04N 5/369*   (2011.01)

(52) U.S. Cl.
  CPC ....... *H04N 5/2226* (2013.01); *H04N 5/23212* (2013.01); *H04N 5/3696* (2013.01)

(56) References Cited

U.S. PATENT DOCUMENTS

| | | | | |
|---|---|---|---|---|
| 6,747,687 | B1* | 6/2004 | Alves | H04N 7/188 340/932.2 |
| 8,340,902 | B1* | 12/2012 | Chiang | G05D 1/0044 340/425.5 |
| 9,275,302 | B1* | 3/2016 | Yan | G06K 9/00201 |
| 2004/0165750 | A1* | 8/2004 | Chew | G06K 9/00885 382/105 |
| 2005/0168321 | A1* | 8/2005 | Fitzgibbon | G07C 9/00158 340/5.53 |
| 2008/0048887 | A1* | 2/2008 | Aoki | G01S 7/4802 340/937 |
| 2008/0080852 | A1* | 4/2008 | Chen | G03B 35/02 396/324 |
| 2010/0128129 | A1* | 5/2010 | Kim | H04N 5/2226 348/164 |
| 2011/0025827 | A1 | 2/2011 | Shpunt et al. | |
| 2012/0187849 | A1 | 7/2012 | Hikmet et al. | |
| 2013/0016203 | A1 | 1/2013 | Saylor et al. | |
| 2013/0250103 | A1 | 9/2013 | Lu et al. | |
| 2014/0055565 | A1 | 2/2014 | You et al. | |
| 2014/0103412 | A1* | 4/2014 | Lee | H01L 27/14605 257/292 |
| 2014/0159925 | A1* | 6/2014 | Mimeault | G01S 17/58 340/935 |
| 2015/0254914 | A1* | 9/2015 | Harucksteiner | E05F 15/76 348/156 |
| 2015/0279022 | A1* | 10/2015 | Shuster | H04N 13/0292 345/427 |
| 2015/0350618 | A1* | 12/2015 | Meier | H04N 9/3185 345/7 |
| 2015/0378023 | A1* | 12/2015 | Royo Royo | G01S 7/4817 356/5.01 |

FOREIGN PATENT DOCUMENTS

| | | |
|---|---|---|
| DE | 102010030108 A1 | 12/2010 |
| DE | 102011053219 A1 | 3/2013 |

* cited by examiner

DIGITAL CAMERA

BACKGROUND OF THE INVENTION

The present invention relates to a digital camera having a 2D image sensor for measuring distances that are used to create a 3D reconstruction of an object.

It is known in the prior art is to measure distances using TOF (time of flight) cameras based on runtime measurements in synchronization with a pulsed infrared source and to carry out a 3D reconstruction of a measured object, based on the measured distances. The sensor of the camera that is synchronized with the infrared source, or the evaluation electronics assigned to the camera, is aware of the moment of transmission of the infrared light and the moment of detection of each individual pixel of the recorded image; i.e., the runtimes of the infrared light associated with the pixel. Since the detected infrared light can originate exclusively from reflections of the object to be observed, the distance of every part of the measured object to the camera, and thus a 3D reconstruction can, therefore, be calculated.

Also known from the prior art is to provide a so-called infrared cut-off filter in front of conventional 2D image sensors. This is required since these sensors are capable of detecting light to the middle infrared, in order to generate good quality recordings in the visible light spectrum. Without such an infrared cut-off filter, deep blue and deep red areas will appear too bright, and hot objects will also appear too bright and in unnatural colors.

SUMMARY OF THE INVENTION

The principal objective of the present invention is to provide a digital camera that can detect visible light and infrared light, so that optionally 2D images in the visible range and/or in the infrared range, can be used to generate 2D images in the visible range combined with a 3D reconstruction of a measured object, based on a runtime measurement in synchronization with an infrared source, or a pure 3D reconstruction of a measured object based on runtime measurement in synchronization with an infrared source. Generally, it should be possible to generate 2D images in the visible range and the 3D reconstruction of a measured object at the same time.

This object, as well as other objects of the invention which will become apparent from the discussion that follows, are achieved, according to the present invention, by providing a digital camera with a 2D image sensor, specifically a CCD or CMOS sensor, that can be used to measure distances based on a runtime measurement in synchronization with a pulsed infrared source, which measured distances are used to carry out a 3D reconstruction of a detected object. The digital camera either has no infrared cut-off filter or has an infrared cut-off filter that can be dynamically activated in full or in part or deactivated in relation to pixels of the image sensor. In the event that the infrared cut-off filter is dynamically activated in full or in part or deactivated in relation to the pixels of the image sensor, individual areas of the image sensor, for which the infrared cut-off filter is deactivated, are used for the 3D reconstruction or for images in the infrared range. The remaining areas of the sensor are used for images of high color quality in the visible light spectrum. In the event that no infrared cut-off filter is present, individual areas of the image sensor are used for the 3D reconstruction or for images in the infrared range. The remaining areas of the sensor are used for images in the visible light spectrum.

Thus, according to one preferred embodiment of the invention a digital camera having a conventional 2D image sensor, the infrared cut-off filter, which is normally employed according to the prior art, can be omitted. Eliminating the infrared cut-off filter ensures a simple structure and at the same time the possibility for distance measurement and 3D reconstruction. According to one particular embodiment of the invention, the color distortion of the colors in the visible range caused by the omission of the infrared cut-off filter can be corrected subsequently using conventional digital signal processing.

As an alternative to omitting the infrared cut-off filter, the filter can, according to another particular embodiment of the invention, be fully or partially activated or deactivated dynamically in relation to the pixels of the image sensor. Here, individual areas of the image sensor, for which the infrared cut-off filter is deactivated, can be used for 3D reconstruction, or for images in the infrared range, and the remaining portions of the sensor can be used for images of high color quality in the visible light spectrum.

According to one variation of the invention, dielectric interference filters can be used as infrared cut-off filters wherein, in dependence on the filter structure, in particular the coating thickness and the structuring of the filter, individual wavelengths are refracted differently. This causes the incident light to split and fall onto individual pixels in dependence on the wavelength.

Thus, when using a dielectric interference filter as the infrared cut-off filter, a different distribution of the refraction index and thus of the incident light across the sensor area can be enabled in dependence upon the wavelength, which blocks the infrared light for a portion of the area. In the context of one embodiment, the dielectric interference filters can be designed to be movable using electromechanical actuators, thereby enabling a dynamic activation or deactivation of the infrared cut-off filter for individual areas.

In addition to the stationary or movably designed interference filters, adjustable micro-mirror arrays can be used, which can, if needed, reflect the respective unwanted light—infrared light, for example—such that it does not fall on predetermined pixels. This forms a dynamically adjustable infrared cut-off filter, in particular in combination with stationary-designed dielectric interference filters.

According to another variation of the present invention, piezo-electrically controllable interference filters can be used as the infrared cut-off filters and, by using the piezoelectric effect, can dampen or amplify targeted wavelength ranges. Through these filters preferably larger areas or the entire sensor area can be dynamically illuminated using individual wavelengths, for example as a function of time in a time-multiplex operation, as will be explained in detail below.

Furthermore, electrically tunable liquid crystal filters can be used as infrared cut-off filters, which allow for a very targeted and flexible control of the wavelengths to pass through.

The respective pixel areas of the sensor can be contiguous, such that individual areas, each comprising a plurality of pixels, is used for a task; e.g., for 3D reconstruction or for images in the infrared range or for images in the visible light spectrum. As an alternative, the sensor area can be assigned alternatingly pixel-by-pixel to the individual tasks.

This concept allows for a simultaneous evaluation of the image contents with different information, namely with images in the infrared range comprising a 3D reconstruction and in the visible light spectrum.

According to another embodiment of the invention, the whole image sensor—that is, the entire sensor area—can be utilized in the time-multiplex operation—i.e., as a function of time for one of the two tasks—resulting in the advantage that the full resolution is retained and only the maximum achievable image rate is reduced. Here, the use of the sensor for images in the infrared range, including 3D reconstruction, and for images in the visible light spectrum is divided by time, wherein the infrared cut-off filter is activated for images in the visible light spectrum and the allocation can be adjusted as a function of time.

According to a further feature of the invention, the infrared-sensitive pixels—i.e., the pixels of the sensor—for which the infrared cut-off filter is deactivated, can be used, in addition to the distance measurement and the 3D reconstruction, by means of pulsed infrared light also for detecting continuous infrared light for images in the infrared range. This can increase the measurement quality in the case of poor visibility, e.g., with fog or in darkness, when the visible spectrum range cannot provide sufficient performance or quality.

As an alternative to using a conventional 2D image sensor, it is possible to use an expanded standard 2D CMOS sensor optimized specifically for TOF tasks. Here, nic mixing detector (PMD)-pixels can be used as pixels optimized for TOF tasks. However, according to the present state of the art this prevents a compact design of the sensor due to the size of these pixels and thus, due to the size of the PMD pixels in the image in the visible light spectrum, large blind pixels are generated which have to be reconstructed by interpolation.

According to the invention, it is proposed to expand a standard 2D CMOS sensor with special pixels in the form of pn-photo diodes, gates or pinned diodes, wherein distance measurement and the 3D reconstruction occurs using these pixels. These pixels allow for a more compact design and can be made in a standard CMOS process. They can advantageously form a more compact sensor in combination with pixels for the visible light. With a sensor formed, in this manner, a reduced IR radiation intensity is required when compared to PMD sensors in order to generate a 3D reconstruction, which also leads to minimization of the influence on the quality of the visible image portion.

Similar to the design with regard to a conventional 2D image sensor, the infrared cut-off filter can be omitted for the pixels of the sensor that are not special pixels, or can be fully or partially dynamically activated or deactivated relative to these pixels of the image sensor. Thereby, the pixels not designed as special pixels of the sensor can be used for images in the infrared range in the event of a non-existent or deactivated infrared cut-off filter and for images in the visible range with high quality in the event of an activated infrared cut-off filter. This concept also has the advantage that the 3D evaluation electronics can be integrated in the sensor.

Five different modes—"images in the visible range", "images in the infrared range", "images in the visible and infrared range", "images in the visible range and 3D reconstruction" and "3D reconstruction"—can be realized with the camera according to the invention. In the context of one embodiment, the wavelength range of the pulsed infrared light can be selected very narrowly for distance measurements, wherein this leads to the possibility of carrying out a 3D reconstruction at the same time with the images in the infrared range and optionally in the visible range in the event of an activated infrared cut-off filter that blocks precisely this wavelength range end is activated for a portion of the pixels of the sensor. The pixels of the sensor associated with the 3D reconstruction can in this case receive only infrared light in the wavelength range of the pulsed infrared light.

Switching between the five modes, "images in the visible range", "images in the infrared range", "images in the Visible and the infrared range", "images in the visible range and 3D reconstruction" and "3D reconstruction," can be done on demand with software or also automatically according to the respective ambient light. For example, it is possible to switch automatically from the mode "images in the visible light" to the mode "images in the infrared range" or "images in the visible and the infrared range" when the ambient brightness drops below a threshold value.

For example, for the application of recognizing a license plate of a motor vehicle, an increase in the overall robustness can be achieved when the detection is based on the evaluation of images in both the visible and infrared ranges.

The camera according to the invention can be used at entry and exit driveways of parking garages for example in order to detect simultaneously or sequentially the color of a vehicle in the visible range, the license plate in the visible and/or the infrared range and/or the dimensions of the vehicle in the 3D reconstruction mode.

The pulsed infrared source required for 3D reconstruction is synchronized with the sensor part, i.e., with the pixels that are used for the distance measurement, wherein the infrared source can be arranged outside the sensor.

In the context of an advantageous embodiment of the invention, the pulsed infrared source is integrated in the image sensor. Since the infrared source is active only for an extremely short time and the reflected infrared light does not arrive at the sensor until the infrared source is already turned off again, the sensor is not outshone when the reflected infrared light arrives with this embodiment.

A digital camera designed according to the invention is preferably used for carrying out a method for operating a vehicle barrier with a barrier column, a barrier arm and a barrier drive mechanism for pivoting the barrier arm between a blocking position and an open position. In this case the digital camera is used for the vehicle recognition, for the license plate recognition, for recognizing a following vehicle and for monitoring for vandalism, whereby the images of the digital camera are evaluated by an evaluation electronics that is connected to the control of the vehicle barrier.

The functions of vehicle recognition, license plate recognition, recognizing following vehicles and monitoring for vandalism can be carried out through the images generated in the visible range and/or through the images generated in the infrared range, wherein by the parallel evaluation of the images of both ranges the robustness of the results is increased. For example, in case where license plates are covered with snow or ice, license plate recognition may bring better results in the infrared range. In an advantageous manner, the infrared range can be used for monitoring for vandalism at low light conditions.

Furthermore, through the enabled 3D reconstruction of the acquired objects, accurate vehicle recognition and classification of the detected object can be carried out. For example, it is possible to recognize whether the detected object is or is not a motor vehicle, and in the event that a motor vehicle is detected, it is possible to determine the type of motor vehicle involved, such that individual tariffs become possible for different vehicle categories. It is also possible to keep a vehicle barrier closed if the defected object is not a motor vehicle.

The 3D reconstruction can be combined with the image in the visible range in order to obtain additional information, for example about the color of the detected vehicle or the ambient brightness.

For a full understanding of the present invention, reference should now be made to the following detailed description of the preferred embodiments of the invention as illustrated in the accompanying drawings.

DESCRIPTION OF THE PREFERRED EMBODIMENTS

The preferred embodiments of the present invention will now be described with reference to FIGS. 1-6 of the drawings.

The digital camera according to the invention has a 2D image sensor designed as a CCD or CMOS sensor that can be used to measure distances based on a runtime measurement in synchronization with a pulsed infrared source. The measured distances are used to carry out a 3D reconstruction of a detected object. The digital camera does not have to have an infrared cut-off filter; however, it can have an infrared cut-off filter that can be dynamically activated in full or in part or deactivated in relation to pixels of the image sensor. In the latter event, individual areas of the image sensor, for which the infrared cut-off filter is deactivated, are used for the 3D reconstruction or for images in the infrared range. The remaining areas of the sensor are used for images of high color quality in the visible light spectrum. In the event that no infrared cut-off filter is present, individual areas of the image sensor are used for the 3D reconstruction or for images in the infrared range. The remaining areas of the sensor are used for images in the visible light spectrum.

Figure 1:
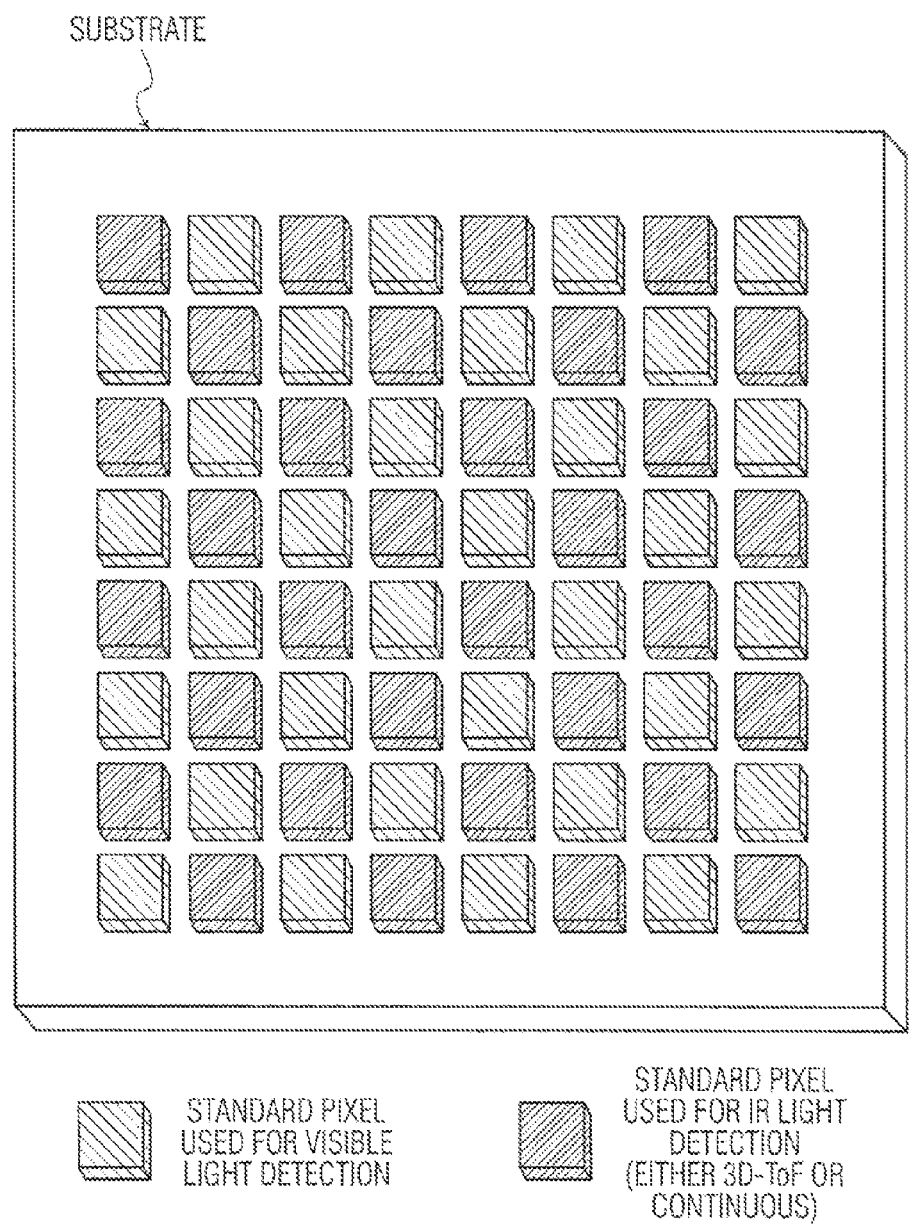
FIG. 1 shows a 2D image sensor without an infrared cut-off filter having standard pixels used for visible light detection and standard pixels used for IR light detection.
Figure 1A:
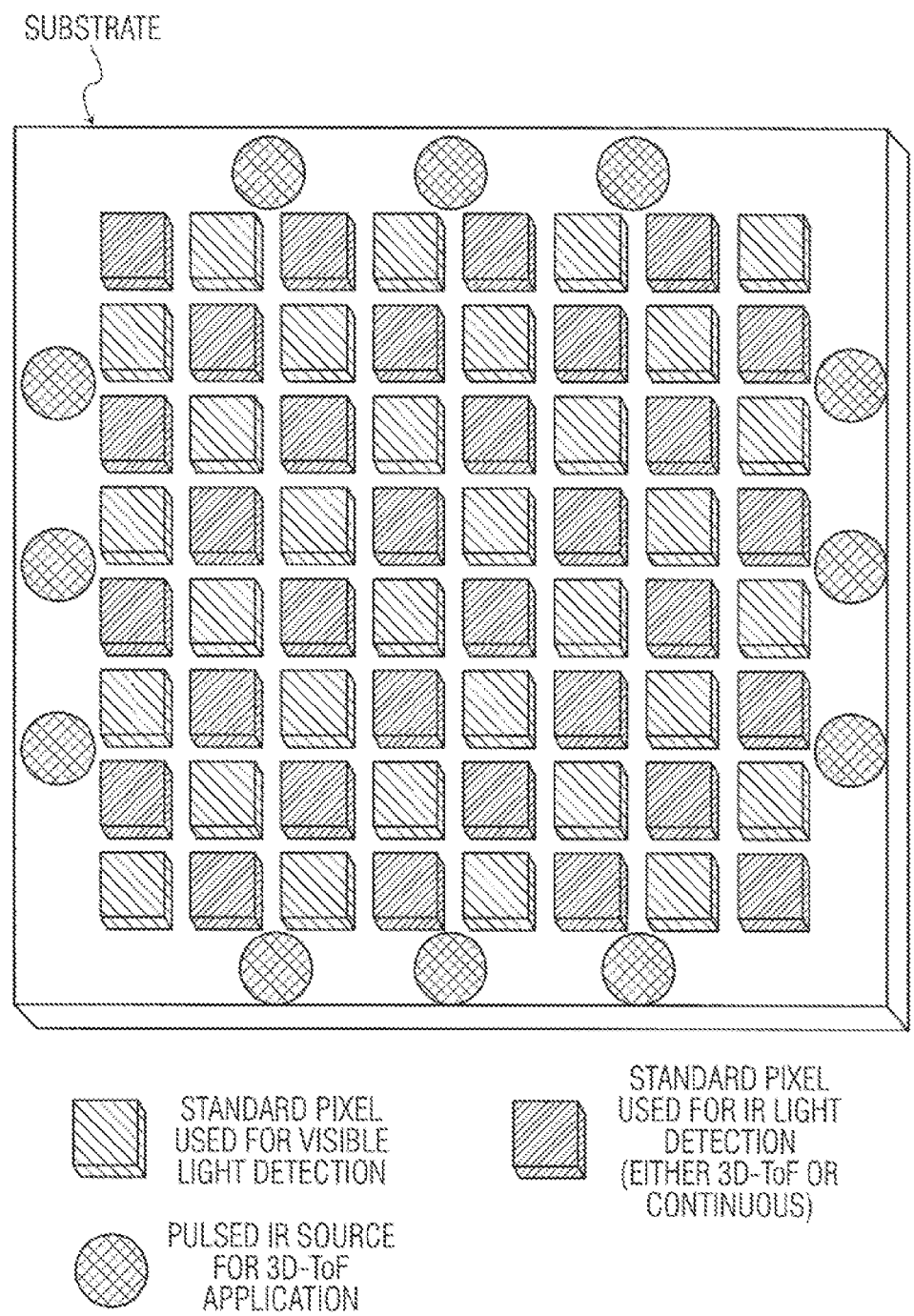
FIG. 1a shows an image sensor according FIG. 1 having pulsed infrared sources integrated into the sensor.

FIG. 1 shows a 2D a CCD or CMOS image sensor without an infrared cut-off filter having standard pixels used for visible light defection and standard pixels used for IR light detection (either 3D-TOF or continuous). FIG. 1a shows this same sensor having a plurality of integrated pulsed infrared sources. According to the invention, the sensor is used to measure distances by sensing the reflected infrared images.

Figure 2:
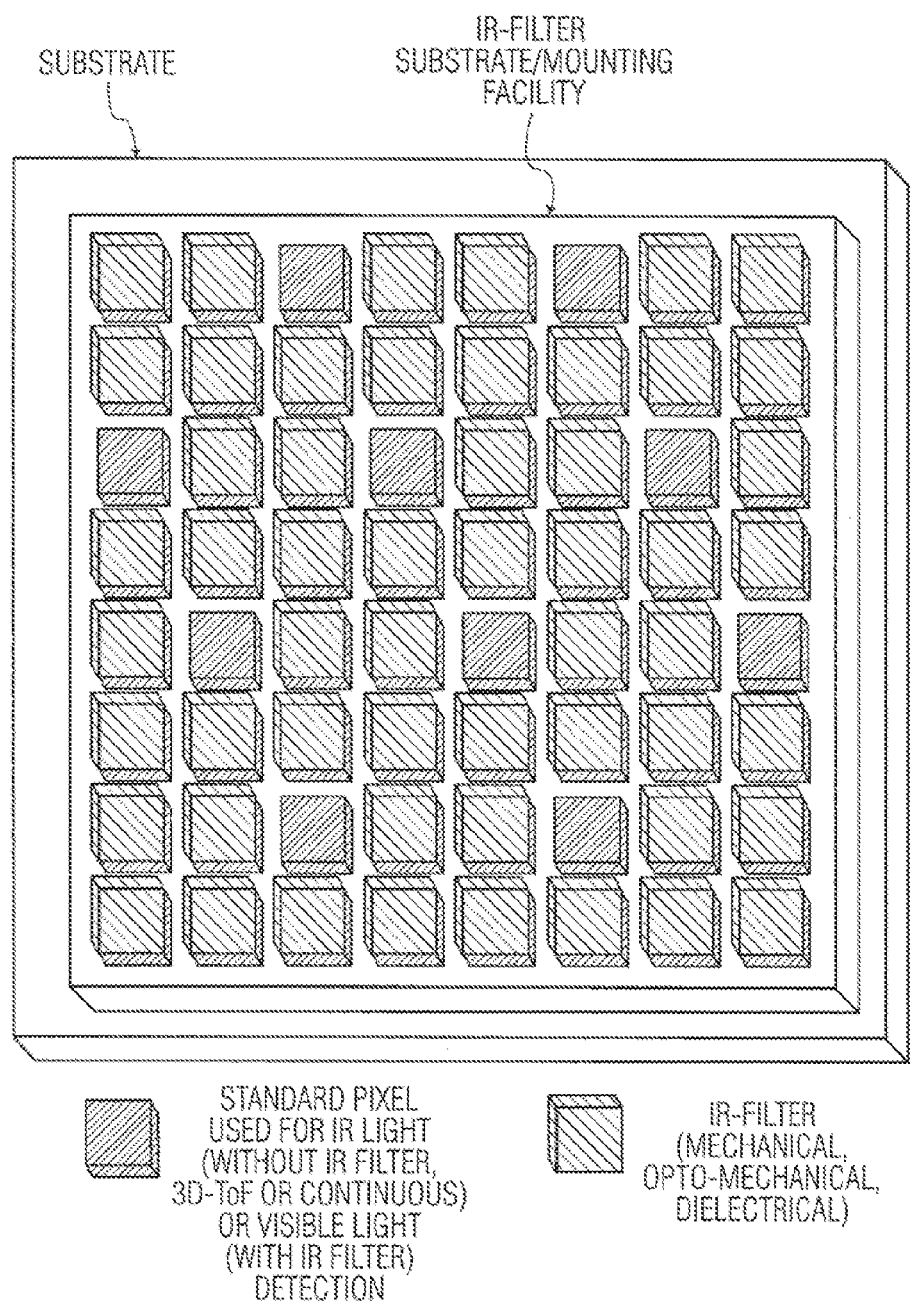
FIG. 2 shows the sensor embodiment of FIG. 1 with the difference that an infrared cut-off filter is provided.
Figure 2A:
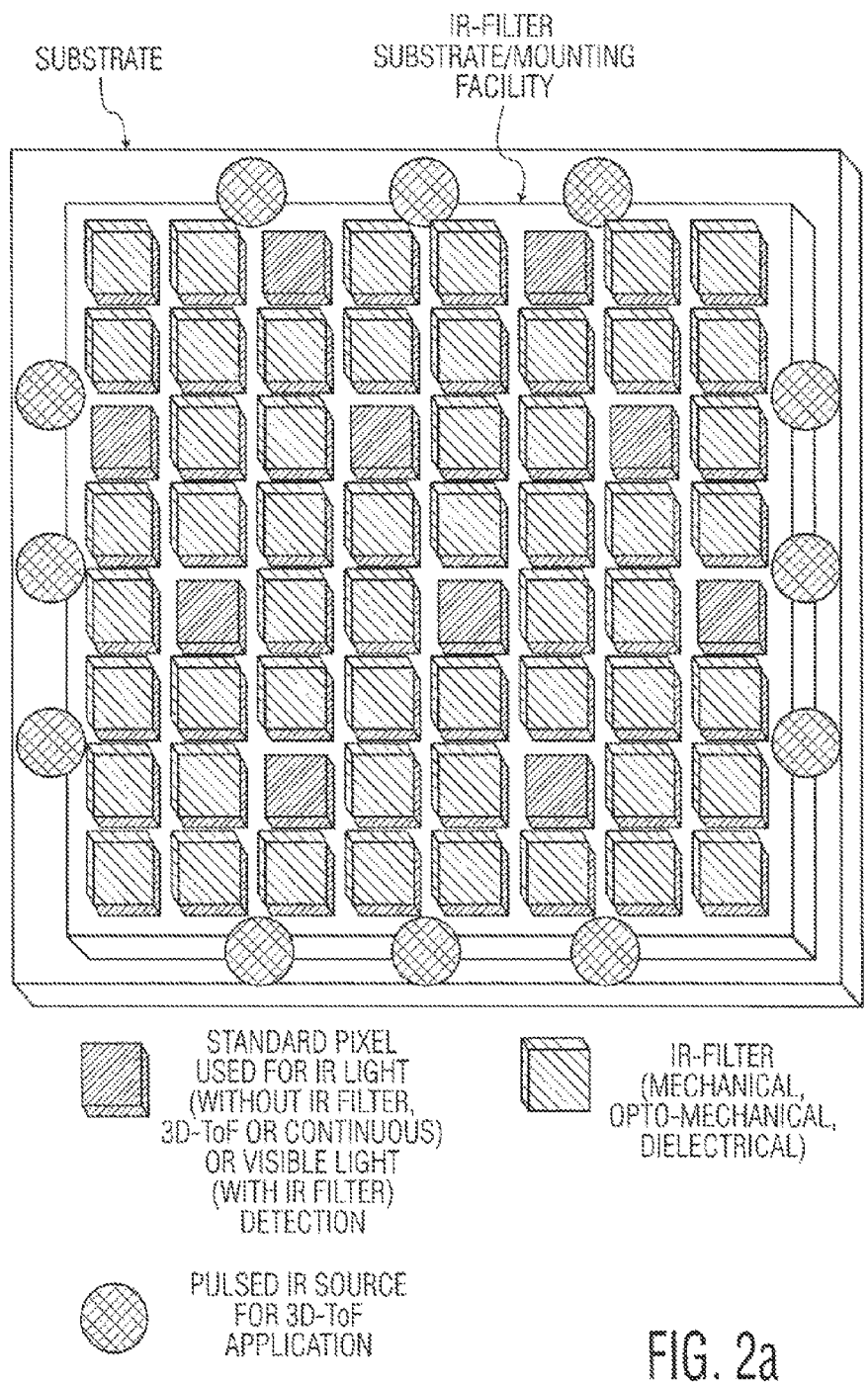
FIG. 2a shows an image sensor according to FIG. 2 having pulsed infrared sources which are integrated into the sensor.

FIG. 2 shows the embodiment of FIG. 1 with the difference that an infrared cut-off filter is provided according to the invention. FIG. 2a shows the same sensor having integrated pulsed infrared sources, in the manner of FIG. 1a.

Figure 3:
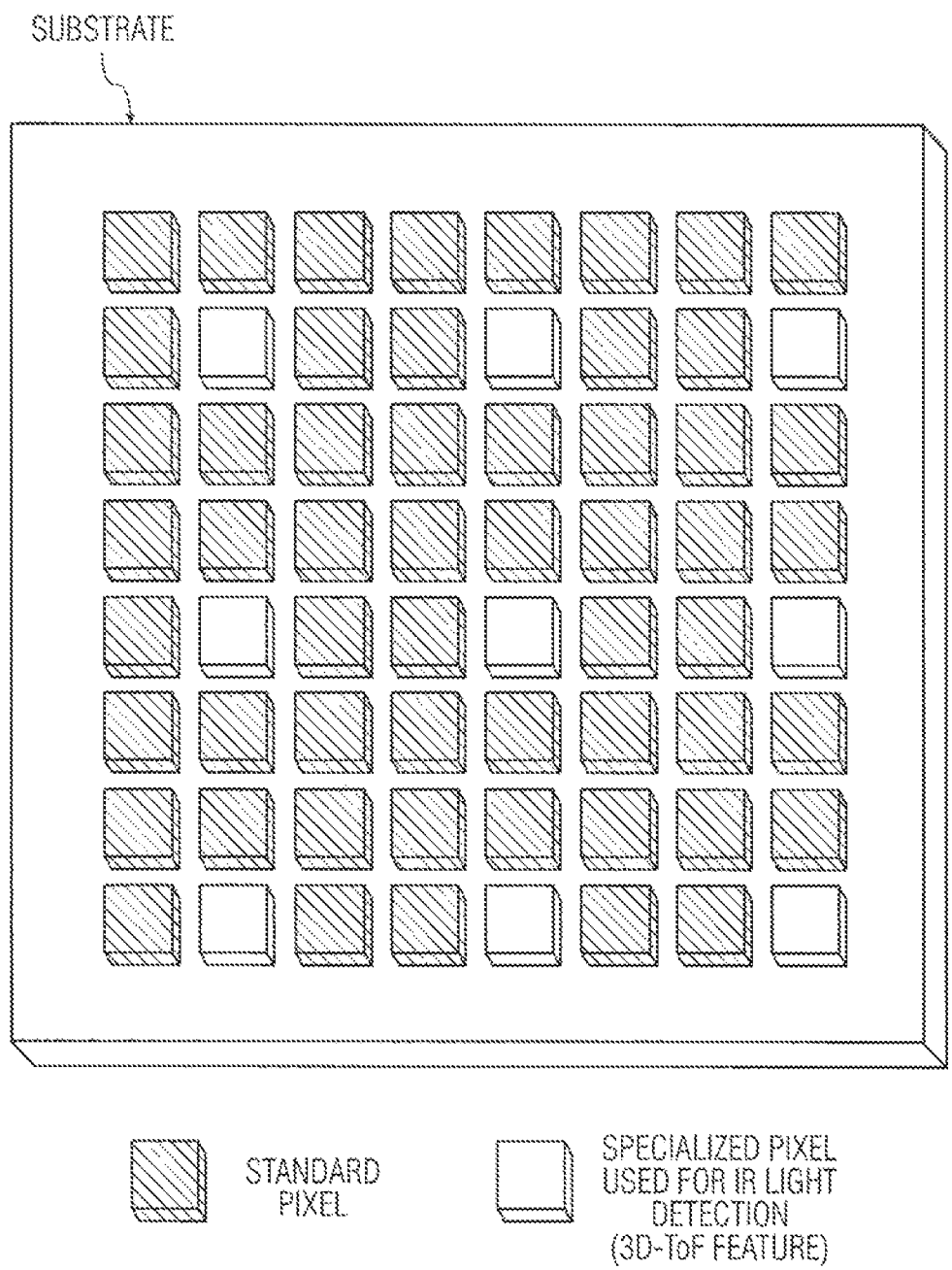
FIG. 3 shows an image sensor having specialized pixels used for IR light detection.

FIG. 3 shows an image sensor having the specialized pixels used for IR light detection. The 2D sensor is operative to measure distances based on a runtime measurement in synchronization with a pulsed infrared source so that a 3D reconstruction of a detected object can be carried out based on these measured distances. The sensor is expanded by special pixels in the form of pn-photo diodes, gates end/or pinned diodes. The distance measurements and the 3D reconstruction are carried out using these special pixels.

The pixels of an image sensor that are not special pixels do not have an infrared cut-off filter or have an infrared cut-off filter that can be dynamically activated in full or in part in relation to these pixels of the image sensor. Individual areas of the image sensor for which the infrared cut-off filters are deactivated are used for images in the infrared range. The remaining areas of the sensor are used for images of high color quality in the visible light spectrum. In the event that no infrared cut-off filter is present, individual areas of the image sensor are used for images in the infrared range and the remaining areas of the sensor are used for images in the visible light spectrum.

Figure 4:
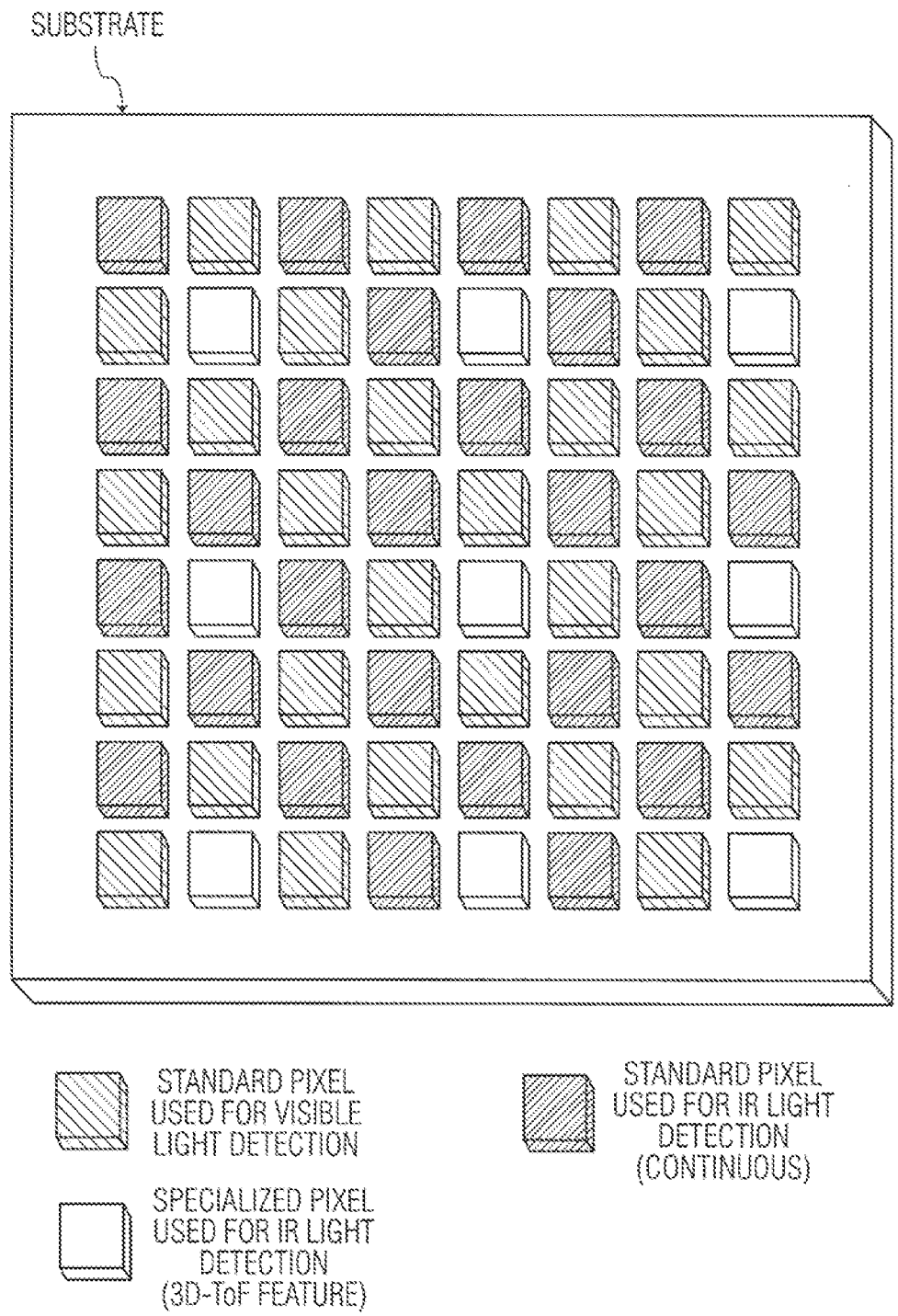
FIG. 4 shows an image sensor with both standard and specialized pixels for IR light detection, without an infrared cut-off filter.
Figure 4A:
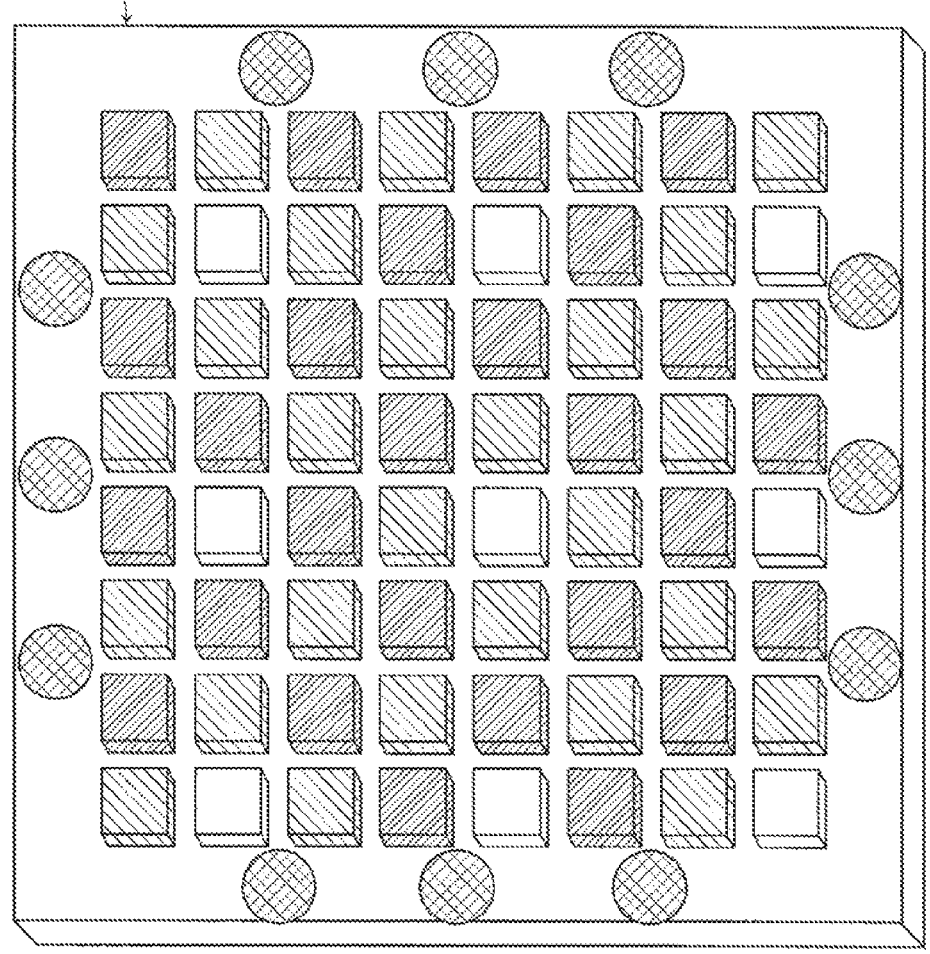
FIG. 4a shows an image sensor as in FIG. 4 having pulsed infrared sources which are integrated into the sensor, wherein the substrate also includes electronics for 3D information calculation.

FIG. 4 shows an image sensor of this type without an infrared cut-off filter. FIG. 4a shows this sensor having integrated pulsed infrared sources and having evaluation logic for the 3D calculation incorporated in the substrate.

Figure 5:
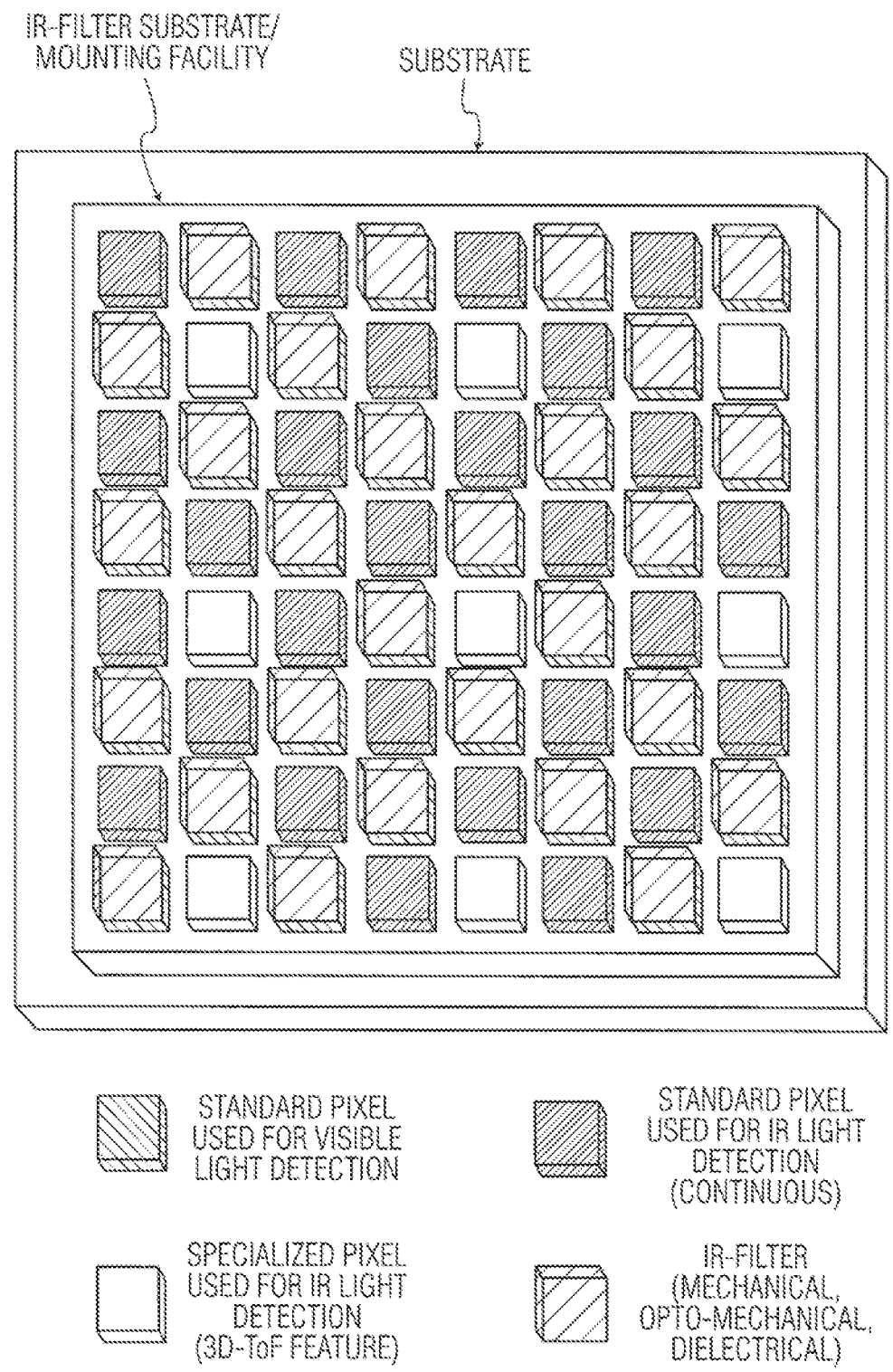
FIG. 5 shows an image sensor as in FIG. 4 with an infrared cut-off filter.
Figure 5A:
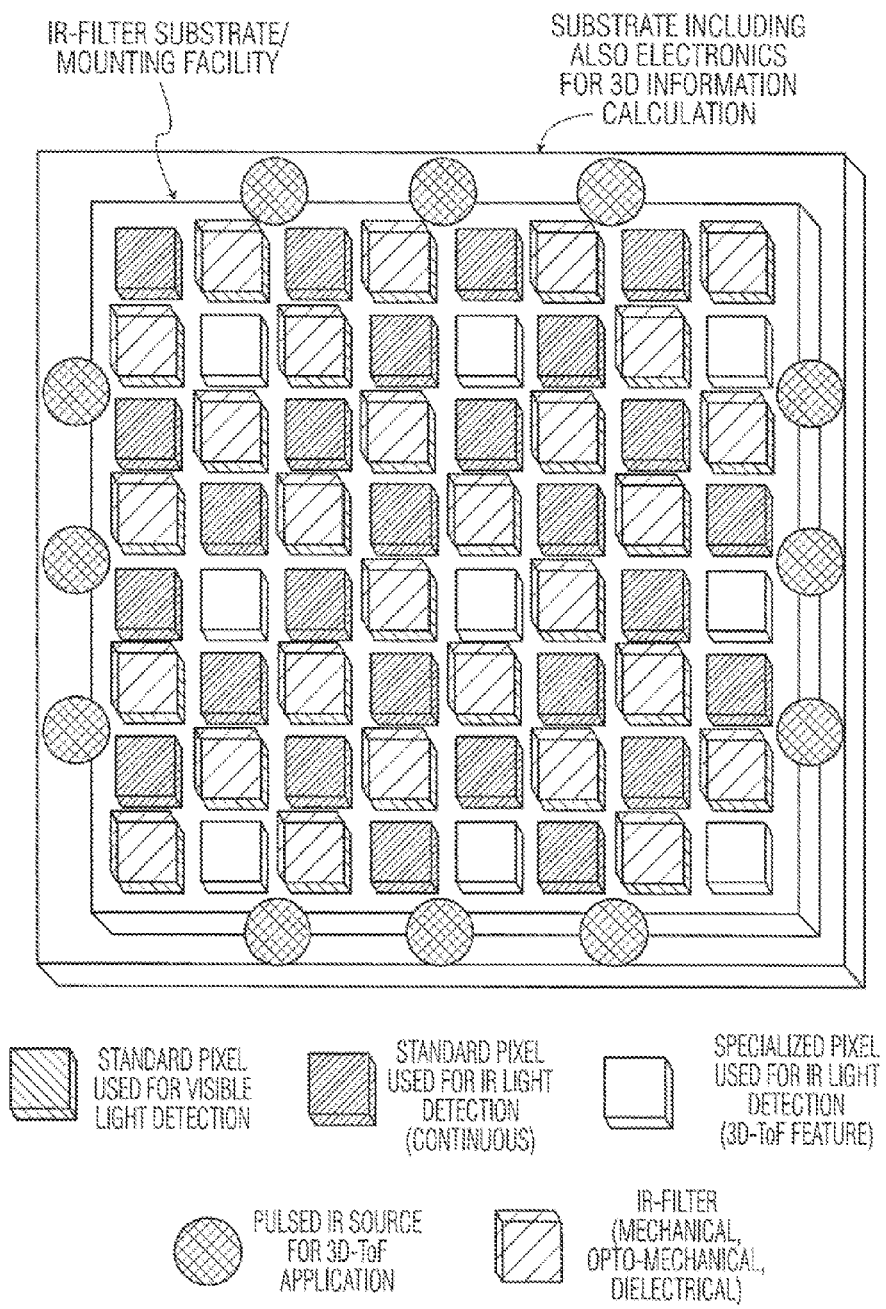
FIG. 5a shows an image sensor according to FIG. 5 having pulsed infrared sources which are integrated into the sensor, wherein the substrate also includes also electronics for 3D information calculation.

FIG. 5 shows a sensor with an infrared cut-off filter. The infrared cut-off filter can be dynamically activated in full or in part in relation to the special pixels that are used for light detection. FIG. 5a shows a sensor of this type having pulsed infrared sources which are integrated in the image sensor. As in the case of FIG. 4a an evaluation logic for the 3D calculation is incorporated into the substrate.

Figure 6:
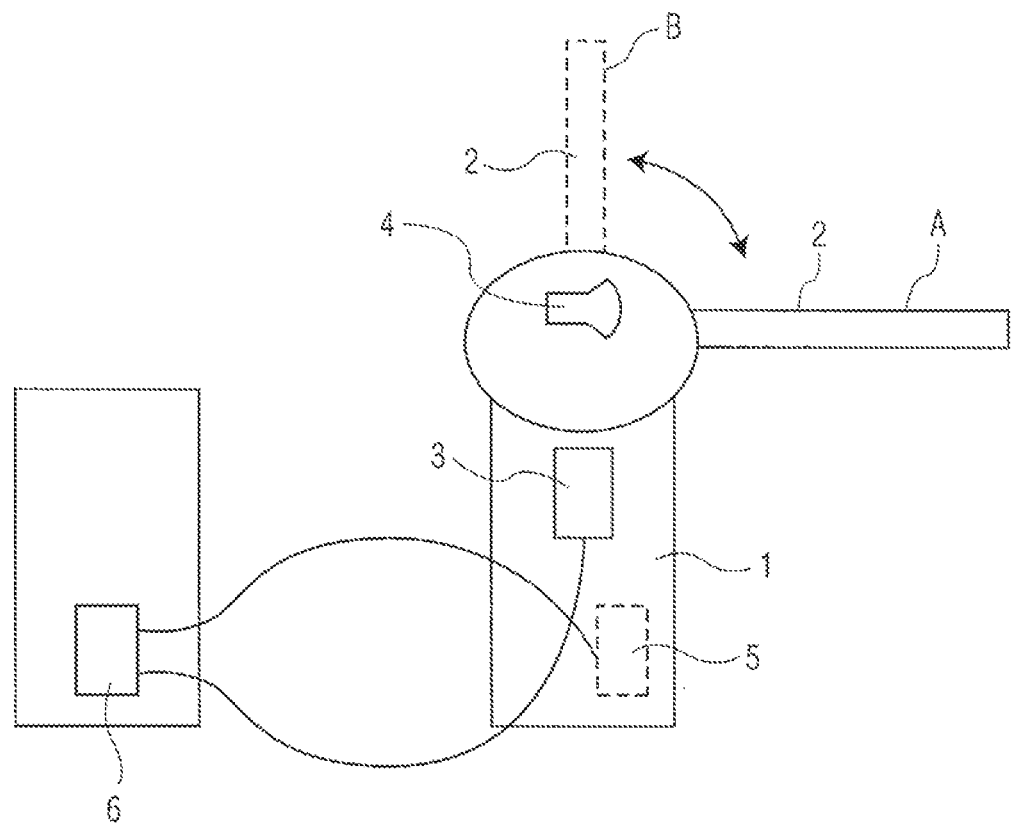
FIG. 6 is a block diagram of a vehicle barrier, having a barrier column, a barrier arm and a barrier drive mechanism for pivoting the barrier arm between a blocking position and an open position, and an electronic system for controlling the same.

Finally, FIG. 6 shows the vehicle barrier having a barrier column 1, a barrier arm 2 and a drive mechanism 3 for pivoting the barrier arm between a blocking position A and an open position B. The digital camera 4 is used for recognizing a vehicle, recognizing a license plate, recognizing a following vehicle and monitoring for vandalism. The images obtained by the digital camera 4 are evaluated by an electronic evaluation logic device 5 that is connected to the control 6 of the vehicle barrier.

There has thus bean shown and described a novel digital camera which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A digital camera with a 2D image sensor that is operative to measure distances based on a runtime measurement in synchronization with a pulsed infrared source and based on which the measured distances are used to carry out a 3D reconstruction of a detected object, the improvement wherein the camera does not have an infrared cut-off filter or wherein it has an infrared cut-off filter that can be dynamically activated in full or in part or deactivated in relation to pixels of the image sensor; wherein in the event that the infrared cut-off filter can be dynamically activated in full or in part or deactivated in relation to the pixels of the image-sensor, individual areas of the image sensor, for which the infrared cut-off filter is deactivated, are used for the 3D reconstruction or for images in the infrared range; wherein the remaining areas of the sensor are used for images of high color quality in the visible light spectrum; and wherein, in the event that no infrared cut-off filter is present, individual areas of the images sensor are used for the 3D reconstruction or for images in the infrared range, whereby the remaining areas of the sensor are used for images in the visible light spectrum.

2. The digital camera defined in claim 1, wherein the respective areas of the sensor are either (1) contiguous, such that individual areas each comprising a plurality of pixels are used for the 3D reconstruction and/or for images in the infrared range and individual areas, each comprising a multitude of pixels for images in the visible light spectrum, or (2) the sensor areas are alternatingly associated pixel-by-pixel with the 3D reconstruction and/or images in the infrared range and images in the visible light spectrum.

3. The digital camera defined in claim 1, wherein the infrared cut-off filter is activated for the entire sensor area in time multiplex operation; wherein the operation of the sensor is divided in time for images in the infrared range, including 3D reconstruction, and for images in the visible light spectrum.

4. A The digital camera defined in claim 1, wherein the image sensor is expanded by special pixels in the form of at least one of pn-photo diodes, gates and pinned diodes; and wherein the distance measurements and the 3D reconstruction are carried out using the special pixels.

5. The digital camera defined in claim 4, wherein the pixels of the sensor that are not special pixels do not have an infrared cutoff filter or have an infrared cut-off filter that can be dynamically activated in full or in part in relation to these pixels of the image sensor; wherein individual areas of the image sensor for which the infrared cut-off filters are deactivated are used for images in the infrared range; wherein the remaining areas of the sensor are used for images of high color quality in the visible light spectrum; wherein in the event that no infrared cut-off filter is present, individual areas of the image sensor are used for images in the infrared range; and wherein the remaining areas of the sensor are used for images in the visible light spectrum.

6. The digital camera defined in claim 4, wherein the image sensor includes an integrated 3D evaluation logic.

7. The digital camera defined in claim 1, wherein the camera is operative to realize five modes: "images in the visible range," "images in the infrared range," "images in the visible and infrared range," "images in the visible range and 3D reconstruction" and "3D reconstruction."

8. The digital camera defined in claim 1, wherein the image sensor includes an integrated pulsed infrared source.

9. The digital camera defined in claim 1, wherein the infrared cut-off filters form a combination with at least one of an adjustable micro-mirror arrangement, a piezo-electrically controllable interference filter and an electrically tunable liquid crystal filter.

10. A method of using the digital camera defined in claim 1, comprising the steps of operating a vehicle barrier having a barrier column, a barrier arm and a drive mechanism for pivoting the barrier arm between a blocking position and an open position, wherein the digital camera is used for at least one of a vehicle recognition, a license plate recognition, recognizing a following vehicle and monitoring for vandalism, and wherein images obtained by the digital camera are evaluated by an electronic evaluation logic device that is connected to a control of the vehicle barrier.

11. The digital camera defined in claim 1, wherein the camera comprises at least one of a CCD or CMOS sensor.

12. The digital camera defined in claim 4, wherein the camera comprises at least one of a CCD or CMOS sensor.

13. The digital camera defined in claim 4, wherein the camera is operative to realize five modes: "images in the visible range," "images in the infrared range," "images in the visible and infrared range," "images in the visible range and 3D reconstruction" and "3D reconstruction."

14. The digital camera defined in claim 4, wherein the image sensor includes an integrated pulsed infrared source.

15. The digital camera defined in claim 4, wherein the infrared cut-off filters form a combination with least one of an adjustable micro-mirror arrangement, a piezo-electrically controllable interference filter and an electrically tunable liquid crystal filter.

16. A method of using the digital camera defined in claim 4, comprising the steps of operating a vehicle barrier having a barrier column, a barrier arm and a drive mechanism for pivoting the barrier arm between a blocking position and an open position, wherein the digital camera is used for at least one of a vehicle recognition, a license plate recognition, recognizing a following vehicle and monitoring for vandalism, and wherein images obtained by the digital camera are evaluated by an electronic evaluation logic device that is connected to a control of the vehicle barrier.

* * * * *